(12) United States Patent
Burns et al.

(10) Patent No.: US 9,744,485 B2
(45) Date of Patent: Aug. 29, 2017

(54) FLUID TREATMENT SYSTEM

(71) Applicants: David Jack Burns, Mineral Wells, TX (US); Timothy L. Holmes, Kingwood, TX (US); Jeremy Michael Stevens, Fort Worth, TX (US)

(72) Inventors: David Jack Burns, Mineral Wells, TX (US); Timothy L. Holmes, Kingwood, TX (US); Jeremy Michael Stevens, Fort Worth, TX (US)

(73) Assignee: PecoFacet (US), Inc., Mineral Wells, TX (US)

( * ) Notice: Subject to any disclaimer, the term of this patent is extended or adjusted under 35 U.S.C. 154(b) by 14 days.

(21) Appl. No.: 14/335,247

(22) Filed: Jul. 18, 2014

(65) Prior Publication Data

US 2015/0048033 A1 Feb. 19, 2015

Related U.S. Application Data

(60) Provisional application No. 61/866,742, filed on Aug. 16, 2013.

(51) Int. Cl.
*B01D 29/33* (2006.01)
*B01D 29/90* (2006.01)
(Continued)

(52) U.S. Cl.
CPC .......... *B01D 29/661* (2013.01); *B01D 29/114* (2013.01); *B01D 29/52* (2013.01); *B01D 29/908* (2013.01); *B01D 2201/265* (2013.01)

(58) Field of Classification Search
CPC ........ B01D 29/23; B01D 29/90; B01D 29/66; B01D 29/908; B01D 29/661; B01D 35/12
(Continued)

(56) References Cited

U.S. PATENT DOCUMENTS 5,401,397 A 3/1995 Moorehead
5,462,678 A * 10/1995 Rosaen .................. B01D 29/15
210/108

(Continued)

FOREIGN PATENT DOCUMENTS

DE 10 2004 053 671 A1 5/2006

OTHER PUBLICATIONS

Purolator Facet, Inc., Innovative Self-Cleaning Filters Metaledge.*
(Continued)

*Primary Examiner* — Robert Clemente
*Assistant Examiner* — Akash Varma
(74) *Attorney, Agent, or Firm* — Reinhart Boerner Van Deuren P.C.

(57) ABSTRACT

There is disclosed a liquid filter system that includes a liquid filter apparatus configured to self-clean without removal of the filter apparatus from the filter system. The filter apparatus uses both a filter media for filtering solids as well as a spin motion imparted to fluid being filtered so that centrifugal force can remove solids from the liquid being filtered. The liquid filter system also includes a gas pulse nozzle in fluid communication with the liquid filter apparatus and is configured to flow gas into the filter media to expel water and debris trapped in the filter media without removing the filter media from the filter system.

13 Claims, 9 Drawing Sheets

(51) Int. Cl.
 *B01D 29/66* (2006.01)
 *B01D 35/12* (2006.01)
 *B01D 29/11* (2006.01)
 *B01D 29/52* (2006.01)

(58) Field of Classification Search
 USPC .................. 210/741, 142, 788, 411, 798
 See application file for complete search history.

(56) References Cited

U.S. PATENT DOCUMENTS

| | | |
|---|---|---|
| 8,371,453 B2 | 2/2013 | Rosaen |
| 2005/0040091 A1 | 2/2005 | Nilsen et al. |
| 2006/0124524 A1* | 6/2006 | Duhe ................. C02F 1/20 210/188 |
| 2008/0034784 A1* | 2/2008 | Schillemeit ......... F04B 27/109 62/470 |
| 2011/0265651 A1* | 11/2011 | Steiner ............. B01D 46/0058 95/279 |
| 2011/0272155 A1 | 11/2011 | Warren |
| 2013/0048575 A1* | 2/2013 | Gruber ................. C02F 1/24 210/749 |
| 2013/0200012 A1 | 8/2013 | Holmes et al. |
| 2013/0206404 A1 | 8/2013 | Whiteley |

OTHER PUBLICATIONS

Innovative Self-Cleaning Filters—Metaledge®; product brochure; Nov. 2006; 12 pages; Purolator Facet, Inc. a Clarcor Company, Greensboro, NC, USA.

* cited by examiner

FLUID TREATMENT SYSTEM

CROSS-REFERENCE TO RELATED PATENT APPLICATIONS

This patent application is a non-provisional application which claims the benefit to U.S. Provisional Patent Application No. 61/866,742, filed Aug. 16, 2013, entitled "Fluid Treatment System" and which patent application is hereby incorporated herein by this reference in its entirety.

FIELD OF THE INVENTION

This invention generally relates to fluid treatment and more particularly to removal of solids in a fluid by a liquid treatment system having self-cleaning filter devices.

BACKGROUND OF THE INVENTION

During oil and gas drilling, well completion, and production, waste water (also called production and flow-back water) is produced. Flow-back water is a waste water stream that flows out of the well after the hydraulic fracturing process is completed. Production water is a salty waste water stream that flows out of the well in conjunction with the oil and or natural gas that the well is producing. Flow-back and production water commonly contain propant sand (sand that is used to hold production reservoir fractures open for oil and gas flow, after the hydraulic fracturing pressure is released), completion chemical and oil mixtures that form semi-solid gels, hydrocarbons, and production reservoir formation solids. Normally, flow-back and production waste water is transported, by truck, from the well to a disposal site or recycling center. At disposal sites, trucks will offload the water by pumping it through a filter, for example a bag filter, followed by a series of separate settling tanks. Once most of the solids and hydrocarbons are removed the waste water is filtered again and pumped into a deep disposal injection well. Waste water recycling centers use the same type of pre-treatment systems to filter and settle hydrocarbon liquids, solids, and semi-solids.

In a typical disposal operation, bag filtration is used for the filtering system. The bag filtration removes solid and semi-solid contaminants that are suspended in the water pumped from the trucks. The bag filtration system is typically located downstream from where the trucks offload and discharge their fluid cargo and upstream from a series of settling tanks. The operators must periodically remove the bag filters from housings and replace them with new bag filters. Such bag filter handling and disposal increase the costs of treating water from gas and oil production sites.

Typically bag filters will fill up and require changing after filtering 100 to 200 barrels of water. Prior to disposal of used bags, operators will dump out collected solids and place the bags on a contaminant containment rack to allow gravity drainage of oil, hydrocarbon liquids and semisolids from the bag. The process is messy, hard to control from an environmental standpoint, and expensive.

The apparatus and method in the present disclosure eliminates the use of bag filters and the associated cost and mess related to such bag filter process. Further, the present disclosure removes solids from fluid in an efficient and cost effective manner. The apparatus of the present disclosure as constructed is both durable and long lasting, and requires little or no maintenance to be provided by the user throughout its operating life. In order to enhance the market appeal, the apparatus of the present disclosure should also be of inexpensive construction to thereby afford the broadest possible market. Finally, it is also an objective that all the aforesaid advantages and objectives to be achieved without incurring any substantial relative disadvantage.

BRIEF SUMMARY OF THE INVENTION

In one aspect, the disclosure provides a liquid filter system.

The liquid filter system is configured to filter a fluid, for example salt water from a mining site facility. The system includes a platform, a tank, pair of filter housings, inlet piping, outlet piping, dump piping, and a controller.

The platform can be of any suitable configuration that is configured to support the several components of the liquid filter system and may be coupled to ground support members, for example wheels. A tank is coupled to the platform and configured to receive water and debris from the filter system as determined by an operator of the system. In one embodiment, the tank may be integrally formed with the platform and in another embodiment the tank is a separate unit and coupled to the platform.

The liquid filter system includes at least two filter housings with each filter housing coupled to the platform. A filter housing is an elongated tube having an upper end and a lower end, with the lower end defining a debris outlet. A tangential input nozzle is disposed proximate the upper end of the tube and is in fluid communication with the tube interior. The nozzle is configured to impart a spin motion to the fluid in the tube. Such spin motion within the interior of the elongated tube imparts a centrifugal force to solid materials suspended in the fluid that is injected into the elongated tube. Such solid materials that have enough mass will be forced to the inside wall of the housing and moved to the debris outlet. An outlet port is defined proximate the lower end of the tube and is in fluid communication with the tube interior.

Each filter housing includes a filter media disposed in the tube between the input nozzle and the output port. The filter media can be of any suitable material for its intended use, for example stainless steel, and configured to filter out a certain micron size particle suspended in the fluid being injected into the filter system. Such micron size filter media is determined by the user of the liquid filter system.

The liquid filter system includes an inlet piping system coupled to each tangential input nozzle and includes at least one selectively controlled valve. An outlet piping system is coupled to each outlet port and includes at least one selectively controlled valve. A dump piping system is coupled to each debris outlet and is in communication with the tank. The dump piping system includes at least one valve. In one embodiment each valve is a butterfly valve.

A controller is coupled to each valve and the controller is configured to selectively control an actuator for the opening and closing of each valve in accord with the predetermined sequence configured in the controller.

In another embodiment, the liquid filter system includes an inlet manifold with a separate inlet conduit extending to each input nozzle and joined at a common inlet port. An outlet manifold, with a separate outlet conduit extending to each outlet port is joined at a common outlet port.

In operation, fluid to be filtered is coupled to the common input port and routed to specific filter housings through the various manifolds as determined by the opened or closed valves. Filtered water is moved to the common outlet port for reuse or further processing as determined by an operator of the liquid filter system. Any of the debris or waste water accumulated in each of the filter housings is routed through the dump piping system into the tank for later disposal or additional processing.

In another embodiment, the liquid filter system includes a gas pulse nozzle in fluid communication with each tube interior. The gas pulse nozzle can be coupled to an extension tube extending into the filter media. The gas pulse nozzle is configured to blow a gas into the filter media to expel water and debris trapped in the filter media. The gas utilized in the gas pulse nozzle can be any gas appropriate for the particular use with the preferred gas being compressed air. The gas pulses can be a single pulse or a series of pulses and can have a duration of anywhere from two to thirty seconds as determined by the user and as programmed in the controller.

The valves, for example a butterfly valve, typically are coupled to an actuator which is also coupled to the controller. The actuator opens or closes the valve as controlled by the controller. The actuator can be one of a pneumatic cylinder, hydraulic cylinder, and an electric motor.

In other embodiments the liquid filter system can include any number of filter housings with the minimum number of housings being two. In a typical configuration, two pair of filter housings will be mounted on the platform with one pair filtering and the second pair held in reserve. When the first pair of filter housings reach a condition of inefficient filtering based on pressure differential, the controller will close the valves to that pair of filter housings and open the valves to the second pair of filter housings to continue filtering of a fluid. In such circumstances, there will be continuous filtering operation by at least two of the filter housings while the other pair of filter housings is cleaned by the gas pulse nozzles without removal of the filter media from any of the filter housings.

There is also disclosed a method of treating fluid in a fluid filter system. The liquid filter system includes a platform supporting a pair of filter housings, each including a filter media. The filter housings are coupled to an inlet piping system including an input nozzle, an outlet piping system, a controller, and a tank.

The method includes receiving a fluid in the filter system, moving the fluid into the pair of filter housings. Removing a portion of the solids from the fluid by centrifugal force by imparting a spin to the fluid in one of the filter housings with the input nozzle. The fluid is then moved through the filter housing wherein an additional portion of the solids in the fluid is removed by the filter media. The fluid is removed from the filter housing and the solids are removed from one of the filter housings.

The moving of the fluid into the filter housing is done intermittently as controlled by the controller with sufficient time between movement to allow for settling of the solids removed from the fluid by both the filter media and the centrifugal spin.

The method also includes cleaning the filter media with a gas pulse from a gas pulse nozzle in fluid communication with each tube interior and coupled to an interior tube extending into the filter media, The gas pulse nozzle is configured to blow gas into the center of the filter media to expel water and debris trapped in the filter media. The solids filtered from the fluid by the filter media are removed from the filter housing through the lower end of the filter housing. The method further includes removing any solids settled from the liquid through the dump piping system into the tank.

There is further disclosed a liquid filter system including a liquid filter apparatus. The filter system apparatus is configured to self-clean without removal from the filter system. The liquid filter apparatus includes an elongated tube having an upper end and a lower end with the lower end defining a debris outlet. The tangential input nozzle is disposed proximate the upper end of the tube and is in fluid communication with the tube interior. The nozzle is configured to impart a spin motion to the fluid in the tube. An outlet port is disposed proximate the lower end of the tube and is in fluid communication with the tube interior. A filter media is disposed in the tube between the input nozzle and the outlet port. A gas pulse nozzle is in fluid communication with the tube interior. The gas pulse nozzle is configured to blow gas into the filter media to expel water and debris trapped in the filter media.

The gas nozzle can be disposed proximate one, or both of the upper end and the lower end of the elongated tube.

In another embodiment, the liquid filter apparatus includes at least one valve coupled to one of the tangential input nozzle and the output port of the elongated tube, with the valve coupled to an actuator and a controller.

It is further disclosed a method of filtering a liquid. The method includes filtering the liquid to a filter media contained in a filter housing, in one direction, during a filtration mode to separate filtered liquid and solids, at least some of the solids forming a solid cake on the filter media. The filter liquid is then directed through an outlet port of a filter housing. Solids are directed toward a debris outlet for eventual collection in a collection tank. Typically the removal of debris occurs when at least half of the filter housing is full of the debris at the debris outlet. Periodically, the solids cake is released from the filter media with a gas pulse wherein the gas drives at least some of the filtered liquid in a reverse direction through the filter media.

In another embodiment, the method includes, the periodically releasing of the solids cake in multiple stages. An initial stage has gas drive at least some of the filtered liquid in a reverse direction through the filter media and in a final stage wherein the gas finishes cleaning the filter element after the filter liquid is evacuated from the filter media. The gas can continue to push the solid and any liquid toward the debris outlet with a transition stage therebetween.

The control of the flow of fluid through the filter system includes opening and closing of valves disposed within the plumbing between the debris outlet and the collection tank, between the input port of the filter housing and the liquid source, and between the output port of the filter housing to one of a common output and the tank.

The method further includes the filter media provided by at least one filter element within the filter housing and disposed such that the filter element comprises a ring of the filter media defining an internal chamber and further defining a region between the filter element and the filter housing through which the debris outlet receives debris filtered from the fluid prior to operating the gas pulse and wherein the internal chamber is at least partially filled with filtered liquid after such drainage due to retention by the filter cake formed on the filter media.

In another embodiment the method includes centrifugally spinning the filter liquid around the filter media in the filter housing to separate some heavier solids that gravitationally flow to a contaminant collection area above the debris outlet and at least partially beneath the filter media. In another embodiment the method includes additional filter housings with each filter housing containing a filter element having the filter media with the method including alternating flow of the fluid between the at least two filter housings and directing the flow of liquid to at least one of the at least two housings that is in a filtration mode and shutting off flow of fluid to at least one of the at least two housings that is in a process of periodically releasing debris and cleaning the filter media.

Other aspects, objectives and advantages of the liquid treatment system will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present disclosure and, together with the description, serve to explain the principles of the disclosure. In the drawings.

Figure 1:
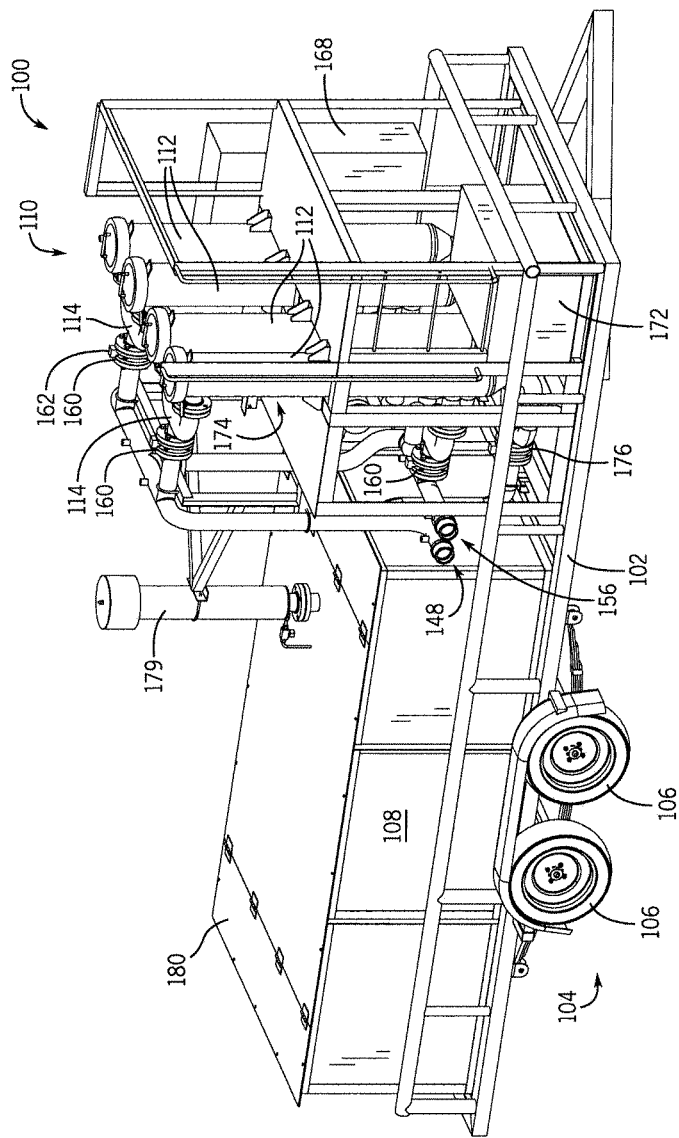
FIG. 1 a perspective illustration of an exemplary embodiment of a liquid filter system including ground support members coupled to a platform configured to support a plurality of filter housings and a tank.
Figure 2:
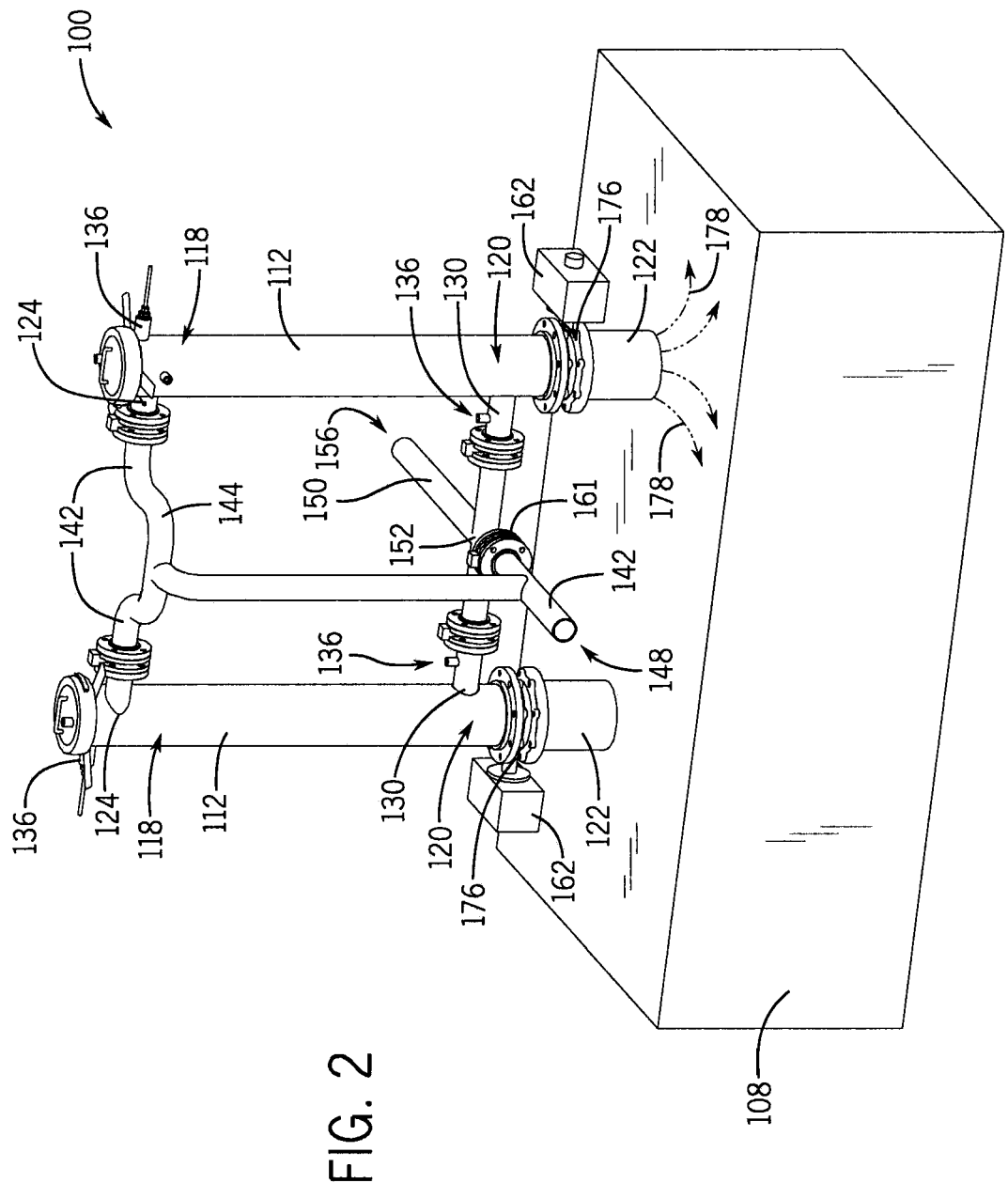
FIG. 2 is a perspective illustration of an exemplary embodiment of a liquid filter system coupled to a tank and including a pair of filter housings and associated piping systems.
Figure 3:
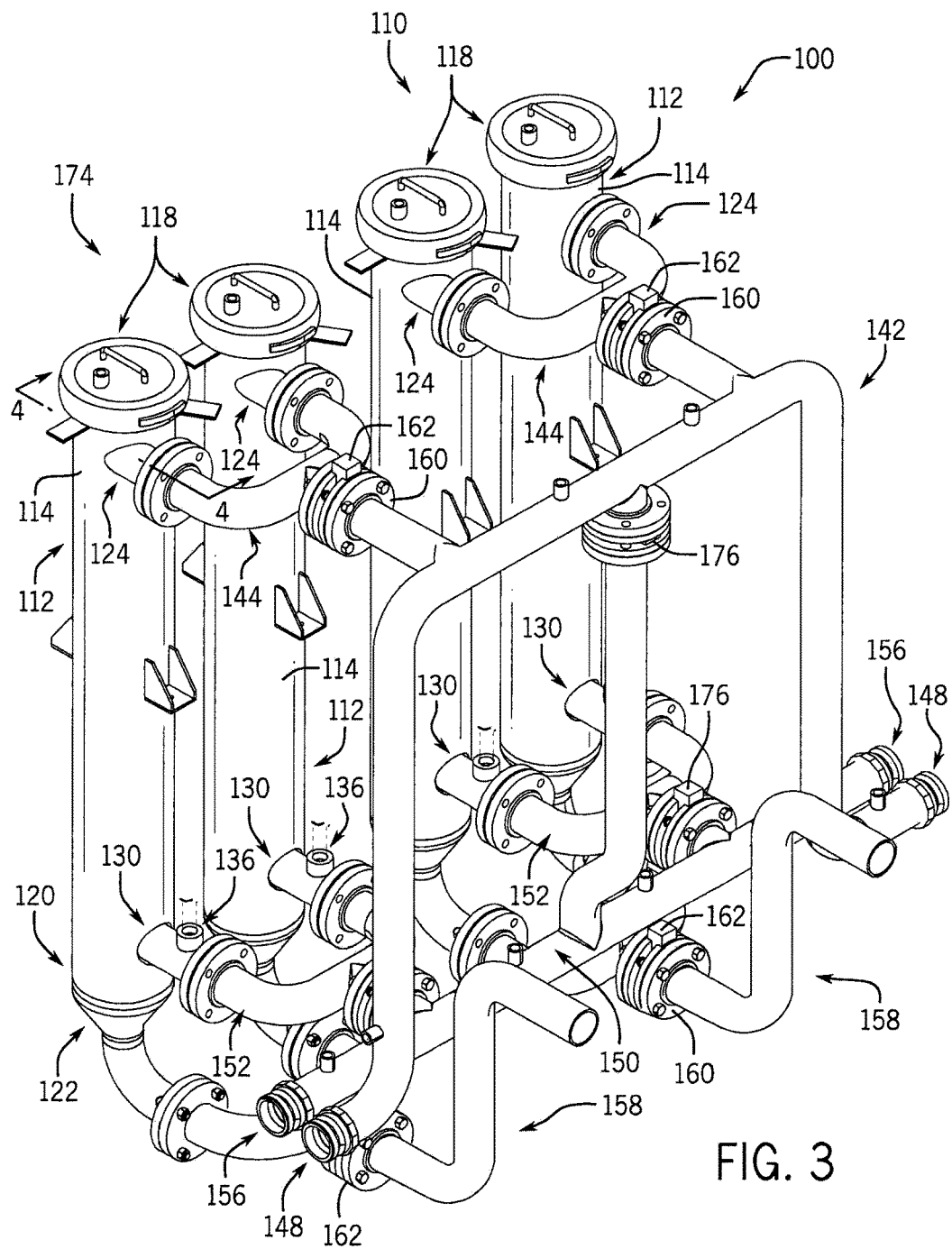
FIG. 3 is a perspective illustration of the liquid filter system illustrated in FIG. 1 including two pair of filter housings coupled to associated piping systems.
Figure 5:
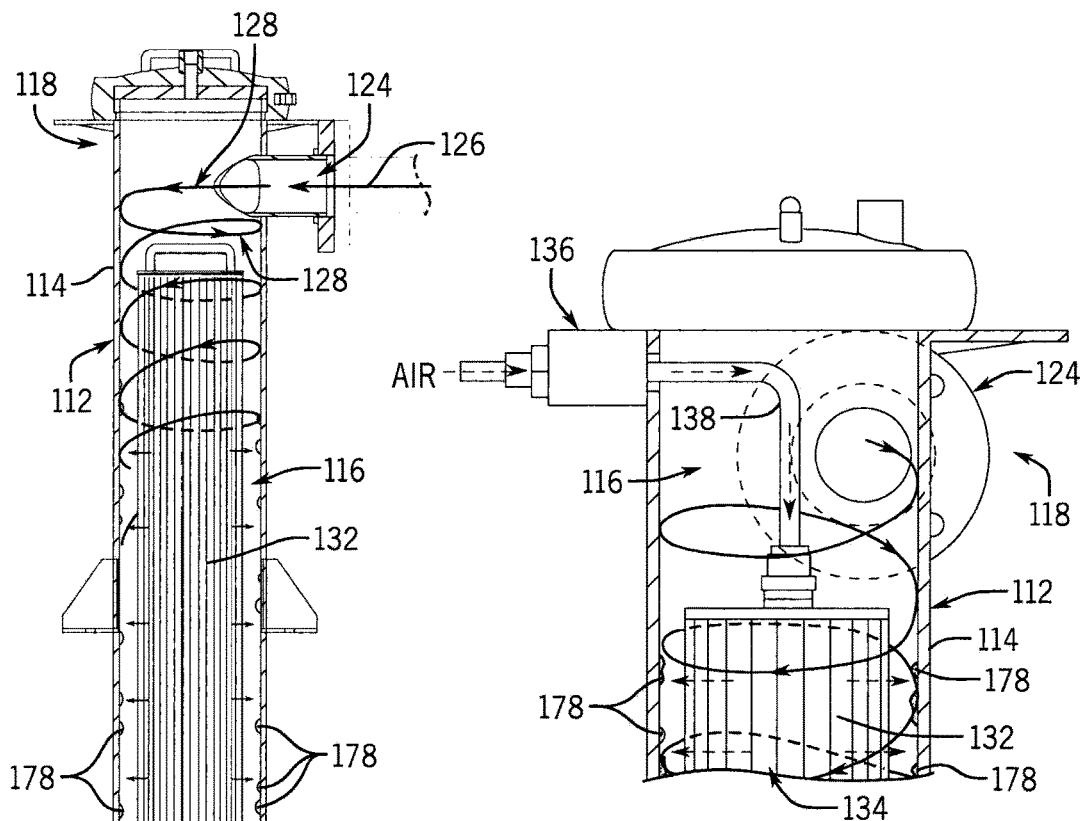
FIG. 5 is a partial side section view of one of the filter housings illustrated in FIGS. 1 and 2 including a gas pulse nozzle disposed proximate the filter housing upper end.
Figure 4:
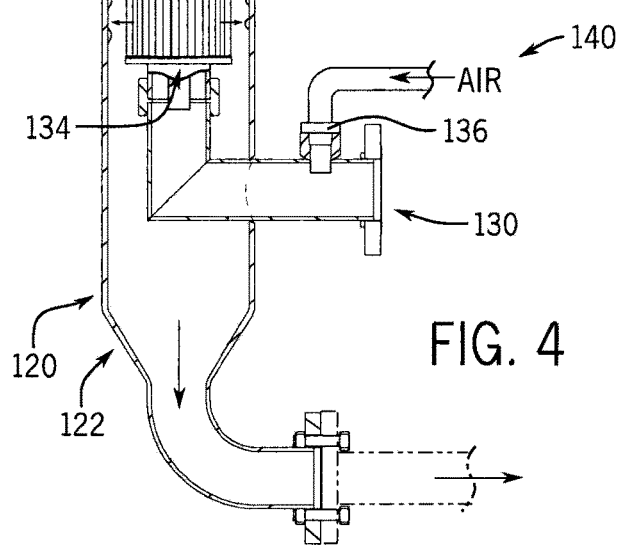
FIG. 4 is a side section view of one of the filter housings illustrated in FIGS. 1 and 2 including a gas pulse nozzle disposed proximate the filter housing lower end.
Figure 6:
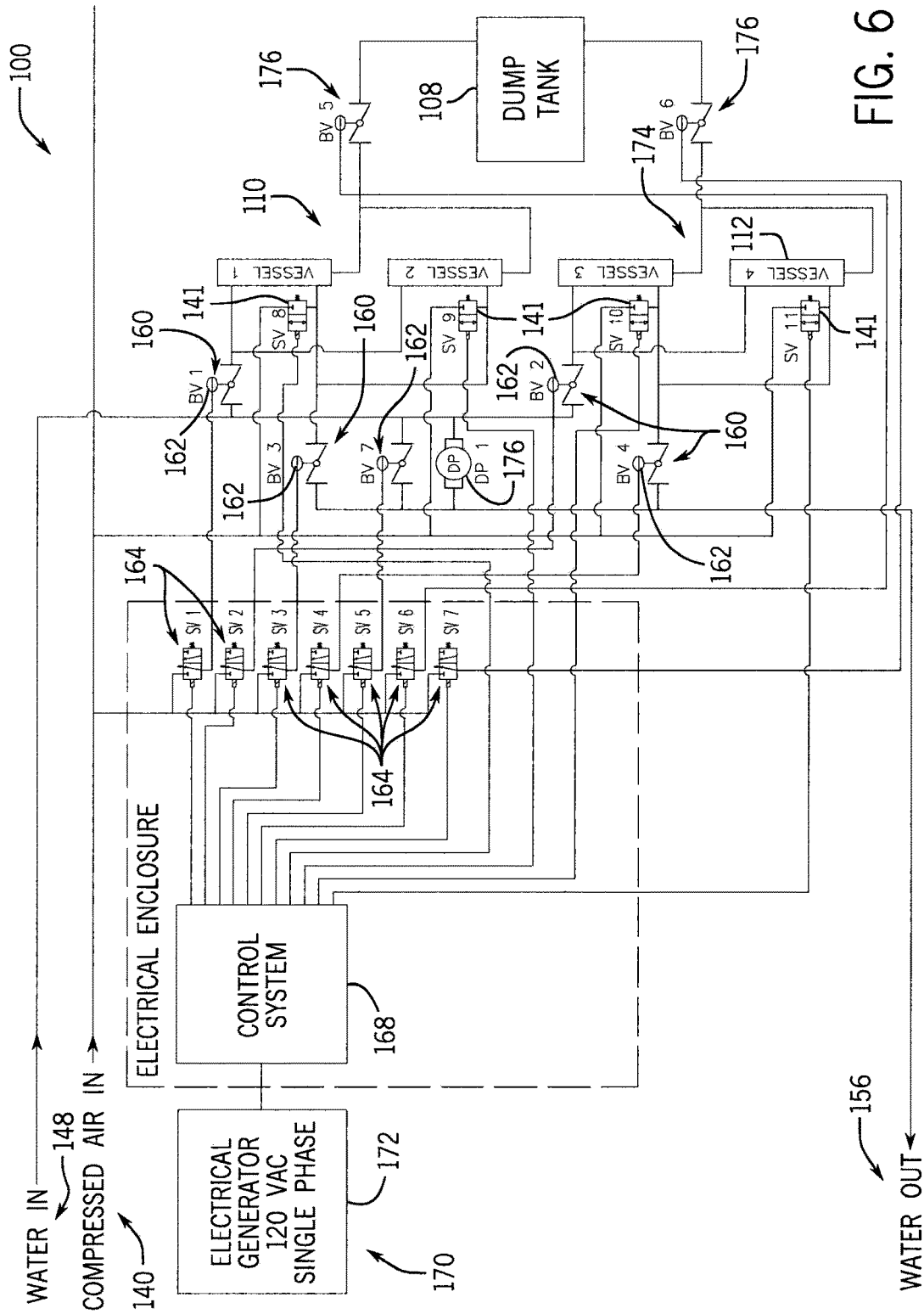
FIG. 6 is a schematic of an exemplary embodiment of a liquid filter system disclosed herein.
Figure 7:
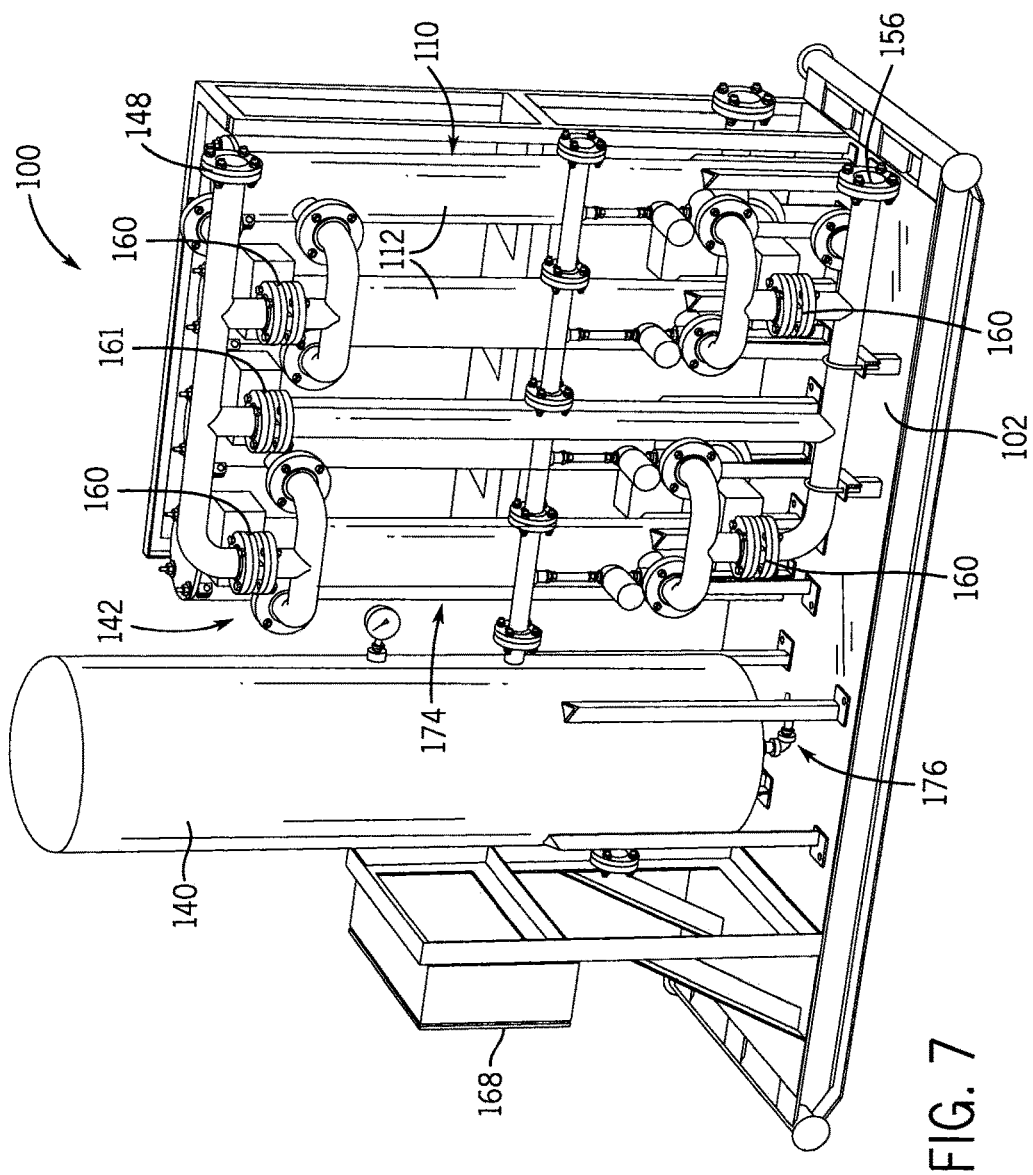
FIG. 7 is a perspective illustration of an exemplary embodiment of a liquid filter system including a vertical tank coupled to a platform and a plurality of filter housings.
Figure 8:
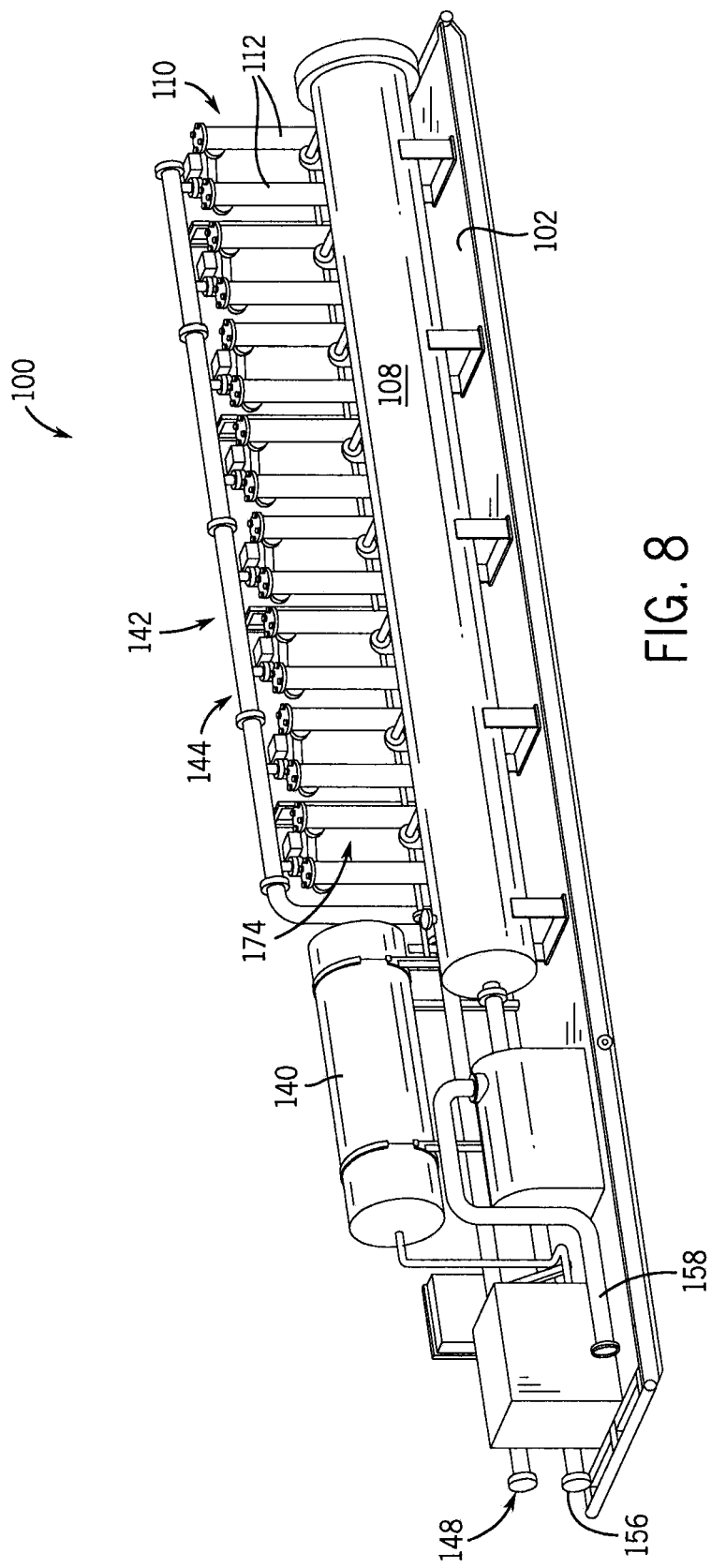
FIG. 8 is a perspective illustration of an exemplary embodiment of a liquid filter system including a horizontal tank coupled to a platform and multiple pairs of filter housings.
Figure 9:
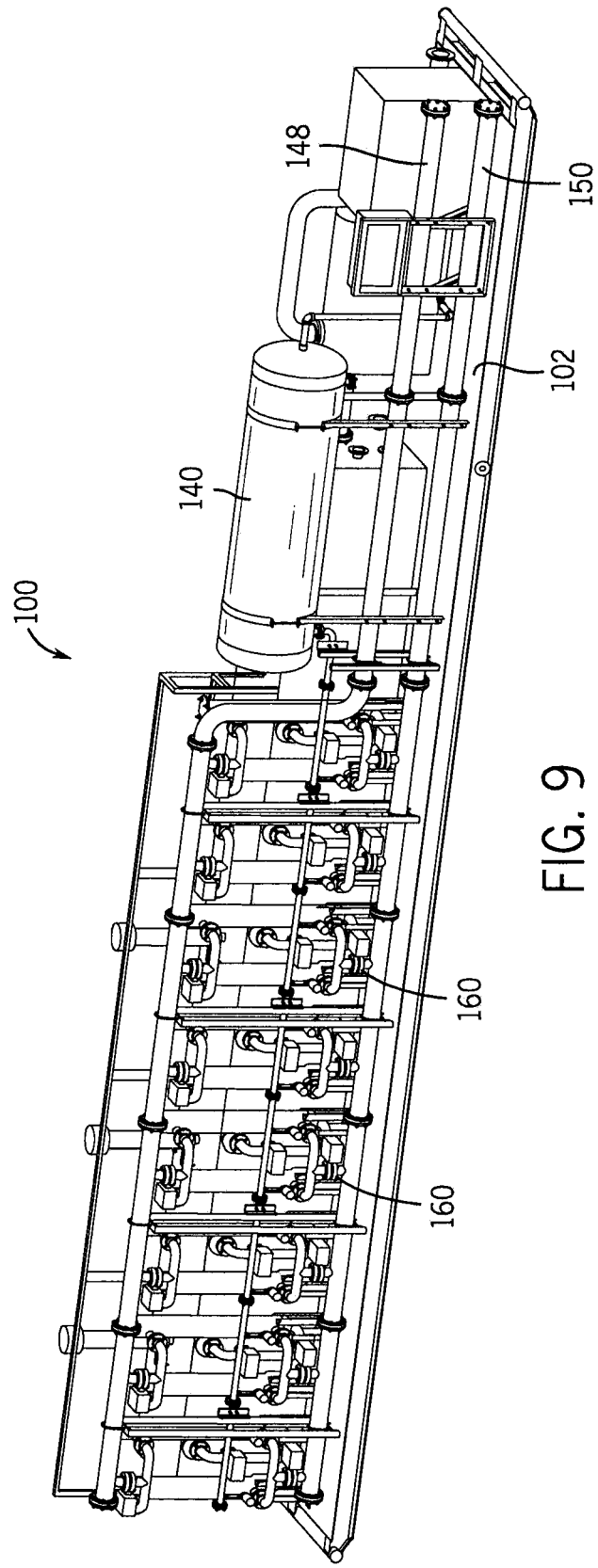
FIG. 9 is a perspective illustration of another side of the liquid filter system shown in FIG. 8.

While the liquid filter system will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF EXEMPLARY EMBODIMENTS

Referring now to the FIGS. 1-10, herein is disclosed a liquid filter system 100 and method which includes self-cleaning filter housings 112. In place of the existing bag filters. This disclosure describes a liquid filter system 100 that includes a self-cleaning system that will eliminate the use of filter consumables, eliminate the need for bag drainage racks, eliminate the need for drivers to manually change-out bags, reduce operational cost, and reduce environmental waste water and solids spill potential. The filter system 100 will utilize a stainless steel filter media 132. The filter media 132 can be similar to Purolator AFG's Poroplate® media or a wedge wire type media or wound wedge wire and wire mesh. Standard filter medias 132 are 6" in diameter×40" long. Filter media 132 can range from 1" in diameter to 12" in diameter and range from 10" to 120" in length. Filter media debris removal ratings are standardly 100 and 200 micron and can range from 10 micron to 500 micron.

The filter media 132 may also include multiple metal filter media layers between an upstream side and a downstream side. The liquid flowing from the upstream side to the downstream side during the filtration mode with at least one of the layers proximate the downstream side having a smaller pore flow size than at least one layer upstream thereof.

In a typical operation at an oil and gas waste water disposal facility, the liquid filter system 100 will use a minimum of two filter housings 112, one operating and one that will either be in a cleaning mode or on standby. Water (typically salt water) frac gel, frac sand, formation solids, and hydrocarbon liquids, and combinations of such materials, or the fluid to be filtered, will enter the on-line filter housing 112 through an inlet port 148 and an inlet piping system 142 to a tangential inlet nozzles 124. An inlet manifold 144 couples the inlet piping system 142 and the filter housings 110. The tangential inlet nozzles 124 will impart a spin 128 on the inlet liquid 126 which will induce a centrifugal force on the liquid stream 126 in the tube interior 116 of the elongated tube 114. The solid and semi-solid particles 178 in the liquid stream 126 that have enough mass will be forced to the inside wall of the filter housing 112 away from the filter media 132. (See FIGS. 4 and 5) A portion of the heavier solid and semi-solid contaminant will spin down the interior wall of the elongated tube 114 into the lower end 120 of the elongated tube 114 (below the filter media 132. (See FIGS. 4 and 5). The filtered fluid exits the filter housings 110 through an outlet piping system 150 coupled to an outlet manifold 152 and common outlet port 156.

Initial separation of heavier larger solids (0.25" in diameter and larger) will help prolong the cycle life of the filter media 132 reducing cleaning cycles. Once the operating filter reaches a set differential pressure (5 to 30 PSID), the liquid flow will be diverted to the standby filter housing 112, by the actuation of valves 160. In one embodiment the valves 160 are butterfly valves 161.

The plugged filter media 132 will be isolated from the flow, by a valve 160, and a cleaning sequence will be started. A controller 168, for example a programmable logic controller, or as also described below will signal an actuator 162 to open a drain valve 176 located at the bottom of the elongated tube 114. A gas pulse solenoid 141 will open and send a pressurized high velocity air stream 140 into the filter housing 112 as a gas pulse at a pressure of 50 to 250 PSI. At this time the elongated tube 114 will be drained, except for water that will be trapped inside the filter media 132. The water inside the filter media 132 will not fully drain out due to the contaminants (frac gel, frac sand, formation solids, hydrocarbon liquids, oil or other contaminates filtered from the liquid) that will have formed a cake on the outside of the filter media 132 plugging it. Once the compressed air 140 is released by the solenoid 141, it will rapidly build up in the interior portion 134 of the filter media 132, under the trapped water, and compressed air 140 will violently force the water through the plugged filter media 132 washing the cake off of the outside of the filter media 132. (See FIGS. 4 and 5, arrows from media)

The self-cleaning process (or back flush) will be a stream of water, followed by two phase flow during the water-air transition, and finally followed by an air flow that will further clean the filter media 132. The high velocity water pushing from the inside to the outside of the filter media 132 will push most of the filter cake off (the filter cake can be from 0.0625" to 1" thick). The transition back flush of air and water will work to break loose some of the small solid particulate 178 (sand) that can be wedged in the openings or pores of the filter media 132. The final air flush will push these particles off of the surface of the filter media 132 and cause them to fall to the bottom of the filter housing 112. The air flow (flushing through the filter media 132 from inside to outside) will then add pressure to the filter housing 112 which will push the contaminants removed from the filter media 132 from the lower end of the filter housing 112 through the opened debris outlet 122 connection. In some circumstances, the gas pulse will be sustained to push the contaminants and debris through the dump piping system 158 into the tank 108. In some circumstances, fresh water will be injected into the system that together with the gas pulse will flush the elongated tube 114 and filter media 132. The contaminants and debris 178, and wastewater will flow to a storage tank 108 and wait for final disposal.

The storage tank 108 will be at atmospheric pressure, for production and frac water service. The storage tank 108 can be located directly underneath the filter housings 112 (see FIG. 2) or at another elevation as shown in FIG. 1. In additional embodiments, the tank 108 is configured as a cylinder.

Normally, once the storage tank (slop tank) 108 is full, a vacuum truck will remove the contaminants 178 from the tank and send it to a processing system that will further process the material, for example separate the solids from the liquid components. The slop tank 108 can be enclosed allowing the use of a mist extractor 179 designed to remove liquid aerosols from the air exiting the tank 108 during the cleaning operation thereby filtering the exhaust air. The unit utilizes gas coalescer technology to clean the exhaust air.

Figure 10:
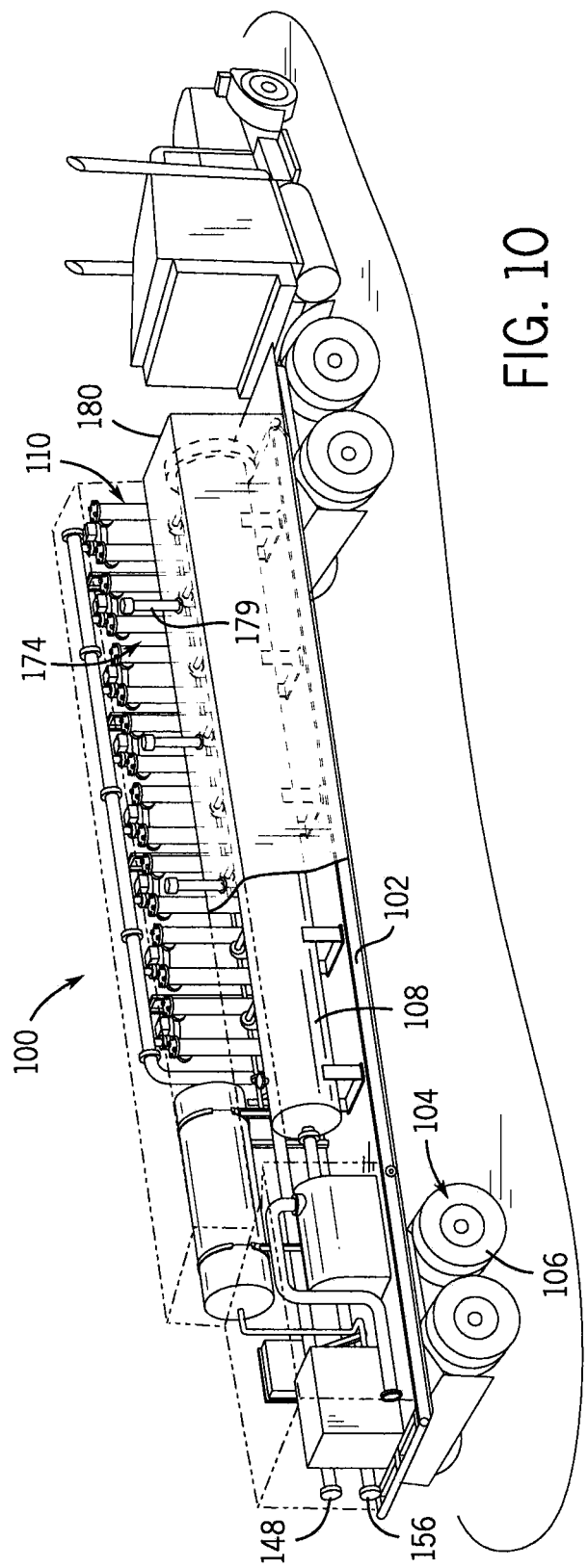
FIG. 10 is a perspective illustration of the liquid filter system illustrated in FIGS. 8 and 9 mounted on a platform including ground support members coupled to a semi-tractor unit.

The tank 108 can be coupled to a platform 102, with the platform 102 including ground support members 104, for example wheels 106 (see FIGS. 1 and 10). In another embodiment, the tank 108 and platform 102 can be a unified integral device, with or without ground support members 104 (see FIGS. 2, 7, 8, and 9). For aesthetic purposes, the liquid filter system 100 can be housed in an enclosure 180 as illustrated in FIG. 10 (solid and broken lines) or as illustrated in FIG. 1 only the tank is enclosed in the enclosure 180.

The gas pulse from the gas pulse nozzle 136 can be a single pulse lasting from 5 to 30 seconds in duration. The air pulse can also be a series of short pulses (2 to 10 seconds). The short pulses will add a shock effect to the filter media 132 which will help in breaking loose small solids that wedge themselves into the media 132 (10 to 100 micron) as described above.

In an exemplary embodiment of a system having two 6 inch diameter×40 inch long elongated tubes 114, in parallel, the gas pulse will operate at a gas pressure range of 50 to 250 PSIG, with a compressor flow rate of 40 to 200 SCFM. In an example test, the system gas pulse operated at 185 SCFM at 100 PSIG. The controller 168 can be programmed to allow the flexibility to adjust the pulse sequence for different types of contaminants.

The air pulse will enter the elongated tube 114 from the gas pulse nozzle 136. The gas pulse nozzle 136 is coupled to the outlet port 130 and in fluid communication with the interior 134 of the filter media 132 (See FIG. 4). In another embodiment the gas pulse nozzle 136 can be disposed proximate at least one of the upper end 118 of an elongated tube 114 and coupled to an extension tube 138 extending into the filter media 132 (see FIG. 5). Another configuration can have the air entering from both the top and bottom of the filter media 132 causing the air to collide in the middle of the filter media 132 providing an increased cleaning force in the center of the filter media 132.

The opening and closing of the butterfly valves 160 is controlled by the controller 168 in one of a manual mode and automatic mode. An example of a typical valve 160 position, for example solenoid valve 164, for a particular operation is illustrated in the following table:

|  | INLET VALVES | OUTLET VALVES | DUMP VALVES | FLUID PULSE SOLENOIDS | BYPASS VALVE |
|---|---|---|---|---|---|
| FILTER OPERATION | OPEN | OPEN | CLOSED | CLOSED | CLOSED |
| SELF-CLEAN OPERATION | CLOSED | CLOSED | OPEN | OPEN | CLOSED |
| BYPASS | CLOSED | CLOSED | CLOSED | CLOSED | OPEN |

1) Manual Control all valves 160 and actuators 162 will be operated individually by a user from a control screen of the controller 168. The controller 168 is coupled to actuators 162 that are associated with the particular valves 160.

2) Automatic Operation all valves 160 are operated automatically using an analog differential pressure reading from one or more sensors coupled to the filter housings 112 to determine when the filter media 132 are sufficiently clogged to warrant cleaning. At a predetermined pressure value selected by a user and programmed in the controller 168, the inlet and outlet butterfly valves 160 are opened by their respective actuator 162 for the filter housing 174 not already in use. The inlet and outlet valves 160 for the pair of filter housings 110 already in use will close when the differential pressure sensor begins to sense a drop in differential pressure from a predetermined pressure value. After a set time, for example ten second pause, to ensure proper seating of the valves 160, the dump valve 176 and the gas pulse solenoid 141 will open and back flush the two clogged filter media 132. The gas pulse will last for a pre-programmed length of time. After cleaning the filter media 132, all valves 160 will remain as they are until the sensors sense a pressure rise high enough to start the cycle again as programmed in the controller 168.

The controller 168 is programmed to operate any number of filter housings 112 in a given system 100. As described herein, the preferred arrangement is four filter housings 112 configured as two parallel filter housing sets 110, 174.

A minimum of two filter housings 112 are typically utilized in the liquid filter system 100. However, more may be used to handle larger flow rates. The preferred system 100 uses two filters operating and two on standby (see FIGS. 1 and 3) and in some embodiments includes multiple pairs of filter (See FIGS. 8-10). The system 100 may be three and three, four and four and so forth. The system 100 could also be configured to use two larger housings that hold multiple filter media in each housing.

A frack and production water liquid filter system 100 will utilize low pressure equipment (100 PSI for the filter housings 112, and atmospheric for the slop tank). The filter media 132 is typically composed of stainless steel. A liquid filter system 100 can be configured to work with other liquid systems and at higher pressures using appropriate sized members and materials.

For volatile liquids such as natural gas liquids, the slop tank 108 can be a pressure vessel and can be designed to handle pipeline pressures commonly ranging from 100 to 1500 PSI. The gas pulse 140 can be any suitable gas for a particular application, with a typical gas being compressed air 140 from a suitable compressed air supply, for example an air compressor. In the case of natural gas liquid filtration the pulse 140 would have to be natural gas or methane. However, all of the same operational principles would apply.

Power to the system 100 is typically provided by a power source 170, for example an electric generator 172 of appropriate rating for a given application. The generator 172 can be mounted onto platform 102 or a separate unit coupled to the platform 102. In some circumstances, power 170 can be provided by a separate power grid coupled to the filter system 100.

The controller 168 may be a microprocessor coupled to the various apparatus of the system 100. The controller 168 may also be a server coupled to an array of peripherals or a desktop computer, or a laptop computer, or a smart-phone. It is also contemplated that the controller is configured to control each individual machine and may be remote from any of the apparatus. Communication between the controller 168 and the various apparatus, for example the butterfly valves, the actuator, or any sensor, may be either by hardwire or wireless devices. A memory/data base coupled to the controller 168 may be remote from the controller 168. The controller 168 typically includes an input device, for example a mouse, or a keyboard, and a display device, for example a monitor screen or a smart phone. Such devices can be hardwired to the controller 168 or connected wirelessly with appropriate software, firmware, and hardware. The display device may also include a printer coupled to the controller 168. The display device may be configured to mail or fax reports as determined by a user. The controller 168 may be coupled to a network, for example, a local area network or a wide area network, which can be one of a hardwire network and a wireless network, for example a Bluetooth network or internet network, for example, by a WIFI connection or "cloud" connection.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the disclosure.

Preferred embodiments of a fluid treatment system are described herein, including the best mode known to the inventors. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of filtering a liquid, comprising:
providing a metal filter media contained in a filter housing, wherein the metal filter media is a wedge wire filter media;
directing an inlet flow through a tangential inlet nozzle and thereby centrifugally spinning the liquid around the metal filter media in the filter housing to separate some heavier solids that gravitationally flow to a contaminant collection area above a debris outlet and at least partially beneath the filter media;
filtering the liquid through the metal filter media in one direction during a filtration mode to separate filtered liquid and solids, at least some of the solids forming a solids cake on the filter media, wherein the liquid is production water from a gas or oil fracking production location, the liquid having entrained therein at least 3 components from the group consisting of frac gel, frac sand, formation solids, and hydrocarbon liquids;
directing the filtered liquid through an outlet port of the filter housing;
directing solids toward the debris outlet for eventual collection in a collection tank; and
periodically releasing the solids cake on the metal filter media with a gas pulse wherein gas drives at least some of the filtered liquid in a reverse direction through the metal filter media, wherein the periodically releasing further comprises multiple stages, including an initial stage wherein said gas drives at least some of the filtered liquid in a reverse direction through the filter media, a transition stage wherein said gas drives a mixture of filtered liquid and said gas in a reverse direction through the filter media, and a final stage wherein the gas finishes cleaning the filter element after the filtered liquid is evacuated from the filter media, wherein the gas pushes the solids and any liquid toward the debris outlet.

2. The method of claim 1, further comprising operating a first valve controlling flow between the debris outlet and the collection tank, closing the first valve for the filtration mode and opening the first valve for the gas pulse, and operating a second valve controlling flow through the outlet port, opening the second valve for the filtration mode and closing the second valve for the gas pulse.

3. The method of claim 2, wherein the metal filter media is provided by at least one metal filter element, the filter housing surrounding the filter element, the at least one metal filter element comprising a ring of the metal filter media defining an internal chamber, further comprising draining a region between the filter element and the filter housing through the debris outlet prior to operating the gas pulse, wherein the internal chamber is at least partially filled with filtered liquid after said drainage due to the filter cake.

4. The method of claim 3, wherein the gas pulse and the periodically releasing occurs when the solids cake creates a pressure differential of between 5 and 30 PSID and wherein the internal chamber is at least ½ full of filtered liquid.

5. The method of claim 1, further comprising using air as the gas and venting the tank to atmosphere wherein during the gas pulse, wherein air is directed through the debris outlet helping to urge solids and any liquids into the tank.

6. The method of claim 5, further comprising filtering the air being vented from the tank.

7. The method of claim 1, wherein the metal filter media comprises at least one metal filter element comprising stainless steel filter media in a ring configuration with a particle removal rating between 10 and 500 micron and that is a wound wedge wire.

8. The method of claim 7, wherein the metal filter media comprises multiple metal filter media layers between an upstream side and downstream side, liquid flowing from the upstream side to the downstream side during the filtration mode, at least one of the layers proximate the downstream side having a smaller pore flow size than at least one layer upstream thereof.

9. The method of claim 8, wherein the at least one metal filter element comprises a diameter between 1 inch to 12 inches, a length between 10 and 120 inches, and a particle removal rating of between 100 and 200 micron.

10. The method of claim 1, further comprising shutting off flow of filtered fluid through the outlet port prior to the gas pulse.

11. The method of claim 1, further comprising:
providing a second filter housing, each filter housing containing a filter element having the metal filter media, wherein the method comprises alternating flow of the liquid between the first and second filter housings; and
directing the flow of liquid to at least one of the first and second filter housings that is in a filtration mode and shutting off flow of liquid to at least one of the filter housings that is in process of periodically releasing.

12. The method of claim 1, wherein the gas pulse is provided at a gas pressure between 50 to 250 PSIG and a flow rate of 40 to 200 SCFM.

13. The method of claim 1, wherein the outlet port is provided proximate to the lower end of the metal filter media, and wherein the gas pulse is provided within the outlet port to thereby drive at least some of the filtered liquid present in the outlet port in a reverse direction through the metal filter media.

\* \* \* \* \*